J. W. DAILEY.
WIRE HANDLE FOR BASKETS, BOXES, AND THE LIKE.
APPLICATION FILED MAR. 3, 1916.
1,223,262.
Patented Apr. 17, 1917.
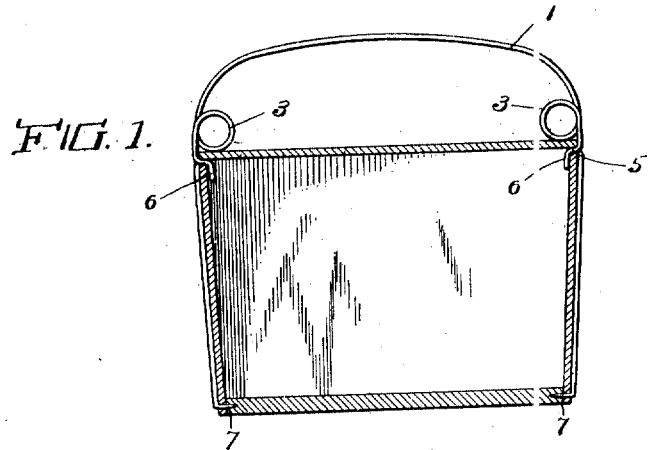
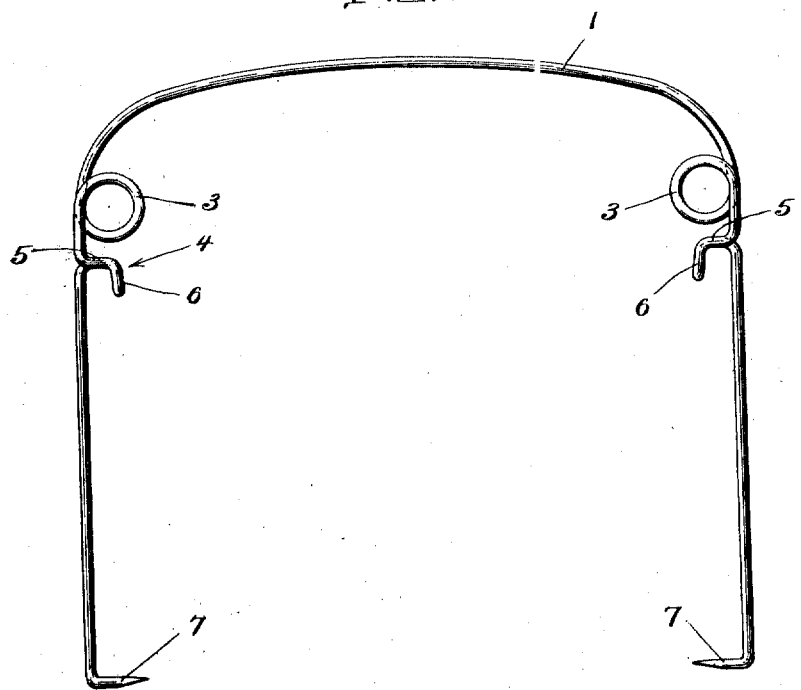
Inventor
J. W. Dailey
Witnesses
A. C. Newkirk
John J. McCarthy
By Victor J. Evans
Attorney

UNITED STATES PATENT OFFICE.

JACOB W. DAILEY, OF FORESTVILLE, NEW YORK.

WIRE HANDLE FOR BASKETS, BOXES, AND THE LIKE.

1,223,262.   Specification of Letters Patent.   Patented Apr. 17, 1917.

Application filed March 3, 1916. Serial No. 81,943.

*To all whom it may concern:*

Be it known that I, JACOB W. DAILEY, a citizen of the United States, residing at Forestville, in the county of Chautauqua and State of New York, have invented new and useful Improvements in Wire Handles for Baskets, Boxes, and the like, of which the following is a specification.

This invention relates to certain novel and useful improvements in wire handles for baskets, boxes and the like and is in the nature of an improvement upon the handle covered by Patent No. 1,021,575, issued March 26, 1912.

In carrying out the present invention, it is my purpose to provide a wire handle for baskets, etc., which may be quickly and rigidly secured to a basket or box and whereby the basket or box may be carried about conveniently.

It is also my purpose to provide a handle of the class described which may be made from a single length of wire formed in such manner as to rigidly and securely engage the box and at the same time provide a hand hold.

With the above and other objects in view, the invention consists in the construction, combination and arrangement of parts hereinafter set forth in and falling within and scope of the claim.

In the accompanying drawing:

Figure 1 is a cross sectional view through a box equipped with a wire handle constructed in accordance with the present invention.

Fig. 2 is an enlarged side elevation of the handle removed from the box.

Referring now to the drawing in detail, 1 indicates a single length of wire bent upon itself between its ends into substantially inverted U-form. Immediately below the horizontal member of the wire, the legs are coiled upon themselves to form loops 3 and immediately below the loops 3 the respective legs are bent upon themselves to form hooks 4 having inwardly extending portions 5 and downwardly projecting bills 6. The lower ends of the legs are bent inwardly to form prongs 7.

In practice, the portions of the legs between the hooks 4 and the prongs 7 embrace the opposite sides of the basket and the prongs 7 penetrate the side walls of the basket and the bottom, while the inwardly extending portions 5 of the hooks 4 engage the upper edges of the side walls of the basket and the bills 6 project downwardly into the basket and engage the inner surfaces of the side walls, as clearly illustrated in Fig. 1 of the drawing. The spaces between the hooks 4 and the loops 3 are such as to nicely receive the side edges of the cover of the basket so as to maintain the cover in position.

From the foregoing description taken in connection with the accompanying drawing, it will be seen that I have provided a basket handle wherein the prongs and the hooks effectively engage the respective portions of the side walls of the basket to hold the handle securely to the basket, while the horizontal portion of the wire is spaced apart from the top of the basket to provide a handhold.

The cover may be disengaged from the handle by pressing down upon the handle and separating the sides of the basket, and may be replaced in a similar manner. When the cover is in place the bills 6 provide a substantial bearing surface for the cover and will not allow the cover to work down into the basket and injure the contents thereof.

I claim:

In combination with a basket having a cover, a resilient handle connected with the basket, said handle being U-shaped and having its side arms bent upon themselves to provide parallel loops projecting inwardly and in direct line with said handle, and having bills formed on said arms immediately below said loops and in line therewith, said bills being adapted to engage the top edge of the basket, and said bills and said loops being adapted to engage the cover and to be disengaged therefrom by a downward pressure on the handle.

In testimony whereof I affix my signature in presence of two witnesses.

JACOB W. DAILEY.

Witnesses:
D. P. PIERCE,
CHARLES McNEAL.

Copies of this patent may be obtained for five cents each, by addressing the "Commissioner of Patents, Washington, D. C."